US007217943B2

United States Patent
Eckardt et al.

(10) Patent No.: US 7,217,943 B2
(45) Date of Patent: May 15, 2007

(54) FILM SCANNER

(75) Inventors: Andreas Eckardt, Berlin (DE); Christoph Dobler, Seefeld (DE)

(73) Assignee: Deutsches Zentrum für Luft-und Raumfahrte e.V., Köln (DE)

( * ) Notice: Subject to any disclaimer, the term of this patent is extended or adjusted under 35 U.S.C. 154(b) by 64 days.

(21) Appl. No.: 11/107,042

(22) Filed: Apr. 15, 2005

(65) Prior Publication Data

US 2005/0263726 A1 Dec. 1, 2005

(30) Foreign Application Priority Data

Apr. 15, 2004 (DE) ...................... 10 2004 018 781

(51) Int. Cl.
*G01V 8/00* (2006.01)
(52) U.S. Cl. ..................... 250/559.02; 250/239; 348/97
(58) Field of Classification Search ........... 250/559.02, 250/239; 358/474, 482, 483, 487, 494; 348/97, 348/98
See application file for complete search history.

(56) References Cited

U.S. PATENT DOCUMENTS

| | | | |
|---|---|---|---|
| 4,891,690 A * | 1/1990 | Hasegawa et al. ........... | 358/514 |
| 5,572,339 A | 11/1996 | Edgar et al. | |
| 5,682,200 A * | 10/1997 | Schilling ...................... | 348/97 |
| 5,703,700 A * | 12/1997 | Birgmeir et al. ............. | 358/487 |
| 5,929,903 A | 7/1999 | Kiesow et al. | |
| 6,157,438 A * | 12/2000 | Kaus ............................. | 355/41 |
| 6,178,016 B1 | 1/2001 | Ashe et al. | |
| 6,256,118 B1 | 7/2001 | Moriarty et al. | |
| 6,753,984 B1 * | 6/2004 | Wada .......................... | 358/475 |

FOREIGN PATENT DOCUMENTS

| | | |
|---|---|---|
| DE | 41 07 608 | 9/1995 |
| DE | 197 31 530 | 1/1999 |
| DE | 102 40 348 | 4/2004 |
| EP | 0 959 617 | 5/1999 |
| EP | 0 959 610 | 11/1999 |
| GB | 2 327 825 | 2/1999 |

OTHER PUBLICATIONS

Minolta DiMAGE Scan Elite 5400. Powerful 35 mm Film Scanner. Firmenschrift. 9242-4929-08 M0503 (MC/ME/VE-E)-A1. Osaka, Japan: Minolta Co., Ltd., 2003.
Massmann, Volker: Der Weg zur digitalen Filmkopie am Beispiel des Spirit DataCine-Filmabtasters. Fernseh- und Kino-Technik FKT, 52. Jahrgang, Nr. Apr. 1998, Seiten 214-217.
Bancroft, David J.: Advanced and Economical Telecine Technology for Global DTV Production. In: 2000 Broadcast Engineering Conference Proceedings, National Association of Broadcasters NAB. Las Vegas: NAB Conference, Apr. 2000.
Schäfer, Jörg: "C-Reality"—Ein neuer Filmabtaster von Cintel. Fernsech- und Kino-Technik FKT, 52. Jahrgang, Nr. Apr. 1998, Seiten 210-213.
European Search Report dated Jul. 5, 2005 issued for European Patent Application No. EP 05 09 00097.

* cited by examiner

*Primary Examiner*—Thanh X. Luu
*Assistant Examiner*—Stephen Yam
(74) *Attorney, Agent, or Firm*—Cohen Pontani Lieberman & Pavane LLP

(57) ABSTRACT

A film scanner is configured with a broadband irradiation source and a film carrier. The film carrier has at least one light passage for a visible spectral channel, and the light passage is oriented to at least one photosensitive photodetector. The photosensitive photodetector is arranged in a housing, and the film carrier is connected to the housing.

9 Claims, 1 Drawing Sheet

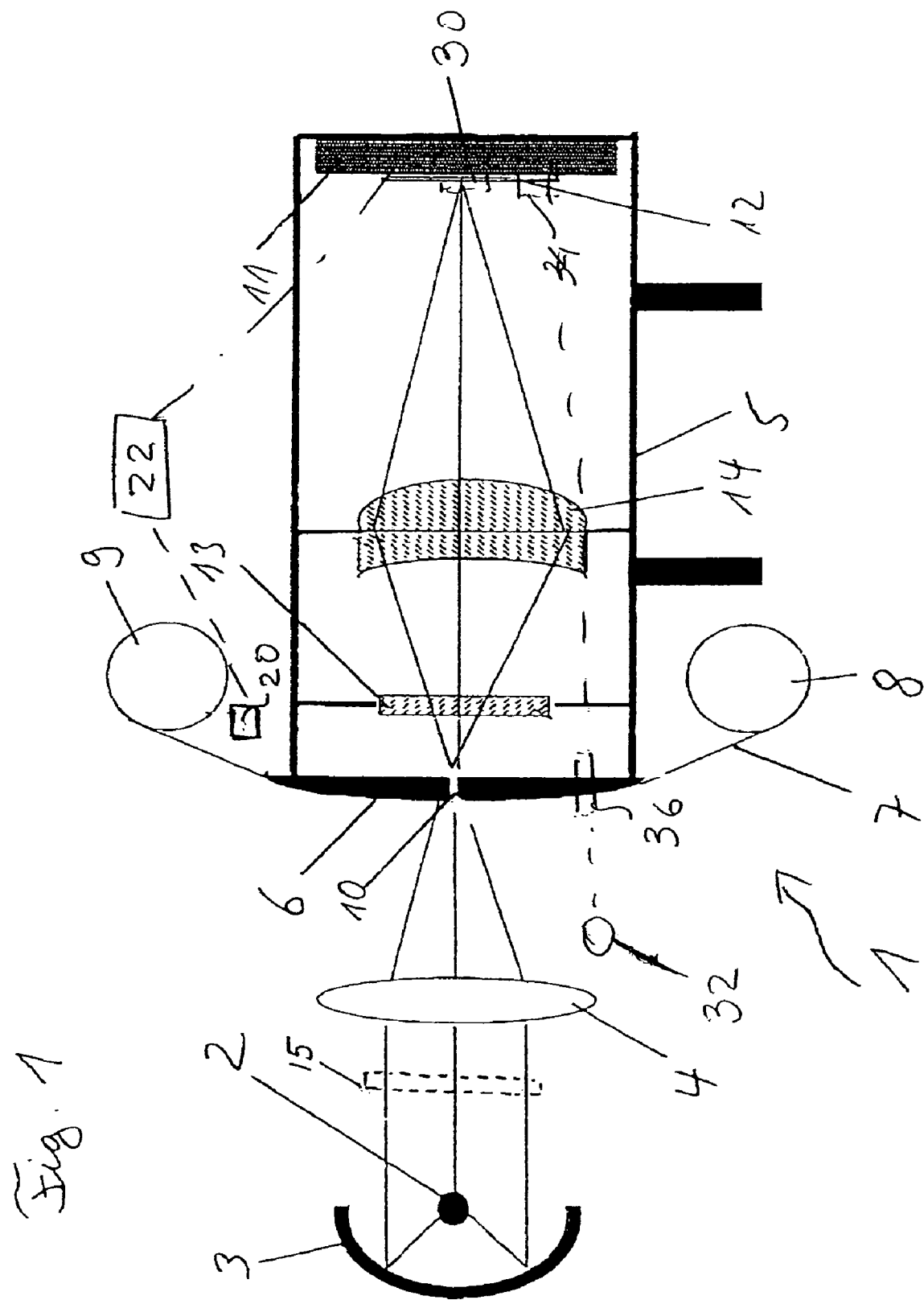

FILM SCANNER

BACKGROUND OF THE INVENTION

1. Field of the Invention

The invention is directed to a film scanner configured with a film carrier and a housing coupled to one another so that at least one light passage, which is formed in the film carrier and traversed by a beam of light from a light source, at least one photosensitive photodetector and an objective, which images the at least one light passage on the photodetector, are fixed in alignment with each other

2. Description of the Related Art

A film scanner is used for converting cinematographic film material into digital data.

GB 2 327 825 A discloses a film scanner comprising a broadband irradiation source which shines through the film material that is transported along a filmstrip holder or film carrier. Optoelectronic detectors are arranged on the side of the film carrier remote of the irradiation source for detecting an RGB image. Further, another, separate IR light source constructed, for example, as an IR LED is arranged on the side of the irradiation source. An optical detector is also associated with the IR light source on the other side of the film carrier. The IR light source with its associated detector serves to detect perforations on the basis of which picture steadiness errors can be corrected. An infrared blocking filter is associated with the optical detectors for the RGB image in order to protect them from the IR radiation.

SUMMARY OF THE INVENTION

It is the object of the invention to provide a film scanner by means of which the geometric accuracy of scanning is improved.

For this purpose, the photosensitive photodetector is arranged in a housing to which the film carrier is connected. In this way, there is a fixed mechanical orientation between the film carrier, light passage and photodetector.

The film carrier is connected to the housing by a reproducible, detachable connection or by a fixed, rigid connection. Further, an objective by means of which the at least one light passage is optically imaged onto the at least one photosensitive photodetector is arranged in the housing.

The objective is rigidly connected to the housing and/or the film carrier. In this way, all of the components necessary for exact geometric alignment are brought together in structural form so that time-consuming alignment can be dispensed with and uniform imaging quality is ensured. The broadband irradiation source is preferably arranged outside the housing.

In a preferred embodiment form, the photosensitive photodetector is constructed as an RGB line sensor. Three lines with an R filter, G filter and B filter, respectively, are arranged in a sensor housing. The distance between the three lines is small enough that the three lines detect approximately the same scene. In this way, three recordings are carried out synchronously for the R line, G line and B line. Therefore, fluctuations in synchronous running can be tolerated to a degree because at least the individual R recordings, G recordings and B recordings are synchronous. The RGB line sensor can be constructed as a CCD line sensor or CMOS line sensor.

In another preferred embodiment form, broadband filters for red, green and blue that are adapted to the sensitivity of the human eye are associated with the photosensitive photodetectors and lines of the RGB line sensor.

In another preferred embodiment form, a plug-in gray filter is arranged in the housing between the film carrier and the photosensitive photodetector. By means of the plug-in gray filter, it is possible to simulate the transmission of the film during the balancing of the broadband irradiation source so that the full radiometric resolution of the photodetector can be made use of. After balancing, the gray filter is removed. The broadband irradiation source is preferably constructed as a white light source.

In another preferred embodiment form, an NIR blocking filter is arranged between the broadband irradiation source and the film carrier. This NIR blocking filter prevents near-infrared irradiation of the photodetector.

In another preferred embodiment form, the film scanner comprises an NIR illumination source which illuminates another light passage, the light passage being optically imaged on an NIR sensor. The NIR sensor serves to detect scratches and/or perforations.

The NIR sensor is constructed, for example, as an RGB line sensor. This is possible because the commercially available filters for RGB line sensors are transparent in the NIR range.

In another preferred embodiment form, the timing of the photosensitive photodetectors is synchronized with the film transport. It is further advantageous that shrinkage of the film material is detected based on a detection of perforations and the synchronization is readjusted in an adaptive manner. When the diameter of the film material (capstan roller) and the absolute synchronization by the perforations are known, the line sensor can determine film shrinkage. This determination is based on the fact that the capstan on a film that is known to be shrunk synchronizes a quantity of scanning lines, which quantity is likewise assumed to be known, with respect to its diameter. The determination of shrinkage is based on the difference between the actual quantity of lines and the quantity of expected lines. Based on this shrinkage measurement, an estimation algorithm is learned which is capable of regulating the synchronization in an adaptive manner. The perforation detection is preferably carried out by means of a combined mechanical and optical measurement of the perforation holes, where the mechanical measurement is carried out by means of an incremental sensor at the capstan roller and the optical measurement is carried out by means of the NIR line sensor.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

A single FIGURE diagrammatically illustrates the inventive film scanner.

DETAILED DESCRIPTION OF THE PRESENTLY PREFERRED EMBODIMENTS

The film scanner 1 comprises a broadband irradiation source 2 with a reflector 3, a first objective 4, and a housing 5. Optionally, an NIR blocking filter 15 may be provided between the source 2 and the first objective 4. A film carrier 6, by means of which the film 7 is transported by driving rollers 8,9, is arranged on the housing 5.

The film carrier 6 is mechanically connected to the housing 5 in an exact manner. The film carrier 6 has a slit-shaped light passage 10 which is illuminated by the preferably stripe-shaped irradiation source 2. A focal plane 11 comprising two RGB line sensors 30 and 34 is arranged on the floor of the housing 5. One RGB line sensor 30 is arranged in the optical axis, wherein the lines are oriented parallel to the light passage 10. The slit-shaped light passage 10 and the lines of the RGB line sensor are arranged transverse to the transport direction of the film 7. An RGB filter 12 for the line sensors is arranged on the focal plane 11, a filter being associated with every line. The second RGB line sensor 34 serves as an NIR sensor. For this purpose, a second light passage 36 is illuminated by an NIR light source which is constructed, for example, as an NIR LED. The light passage is optically imaged on the second RGB line sensor. The NIR light source 32, the second light passage 36 and the second RGB line sensor 34 are arranged so as to be laterally offset with respect to the optical axis. Further, a plug-in gray filter 13 and a second objective 14 are arranged in the housing 5. A balancing of the irradiation source 2 can be carried out by means of the gray filter in order to adjust the illumination strength in such a way that the radiometric resolution of the RGB line sensor 30 can be fully utilized. During this matching, the gray filter takes over the function of the film 7 because they have the same transmission values. After the adjustment of the irradiation source 2, the gray filter is removed. The objective 14 images the light passage 10 on the RGB line sensor 30 in the optical axis. The objective 14 is rigidly connected to the film carrier 6. For this purpose, the objective 14 is connected either to the housing 5 and/or directly to the film carrier 6. In a preferred embodiment form, the housing is constructed in two parts, one housing part being rigidly connected to the film carrier 6 and the objective 14. This housing part is connected in a detachable but reproducible manner to a second housing part which carries the focal plane 11. The film transport is then synchronized with the timing of the RGB lines and the analogous pixel values are then digitized, processed and stored.

Shrinkage of the film material is detected based on a detection of perforations by an incremental sensor 20 generating an output signal in response to detection. This signal is received by a control unit 22 operative to adaptively readjust synchronization between the timing of RGB line sensor 30 and the velocity of film carrier 6.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A film scanner comprising:
   a broadband irradiation source emitting a light beam propagating along a path;
   a film carrier member spaced downstream from the broadband irradiation source and operative to carry a film having pieces of image information recorded thereon, the film carrier member having at least one light passage traversed by the light beam;
   at least one photosensitive photodetector in a focal plane;
   an objective operative to optically focus the at least one light passage onto the at least one photosensitive photodetector; and
   a housing member comprising first and second housing parts, the first housing part being rigidly fixed to the film carrier member and to the objective, the second housing part carrying the focal plane, the first housing part being connected to the second housing part in a detachable but reproducible manner.

2. The film scanner according to claim 1, wherein the at least one photosensitive photodetector is constructed as an RGB line sensor.

3. The film scanner according to claim 1 further comprising broadband filters for red, green and blue located downstream from the at least one light passage and optically coupled to the at least one photosensitive photodetector, the broadband filters being adapted to a sensitivity of a human eye.

4. The film scanner according to claim 1 further comprising a plug-in gray filter located along the path between the film carrier member and the objective.

5. The film scanner according to claim 1 further comprising an NIR blocking filter located along the path between the broadband irradiation source and the film carrier.

6. The film scanner according to claim 1 further comprising an NIR illumination source spaced from the broadband irradiation source, a second light passage provided in the housing member in a spaced apart relationship with the at least one light passage, and an NIR sensor spaced laterally from the at least one photosensitive photodetector wherein the NIR illumination source, the second light passage and the NIR sensor are fixed in alignment with one another.

7. The film scanner according to claim 6, wherein the NIR sensor is constructed as an RGB line sensor.

8. The film scanner according to claim 1, wherein timing of the at least one photosensitive photodetector is synchronized with a speed at which the at least one carrier member advances the film.

9. The film scanner according to claim 8 further comprising an incremental sensor operative to generate an output signal upon detecting holes on the film and a control unit coupled to the at least one photosensitive photodetector and incremental sensor, the control unit being operative to detect shrinkage of the film upon receiving the output signal from the incremental sensor and to adjust synchronization between the timing of the least one photosensitive photodetector and the speed of the carrier member upon detecting the shrinkage.

* * * * *